United States Patent
Williams

(10) Patent No.: US 11,493,529 B2
(45) Date of Patent: Nov. 8, 2022

(54) SYSTEM FOR DETERMINING MUZZLE VELOCITY OF A FIREARM

(71) Applicant: Hydra Concepts, San Carlos, CA (US)

(72) Inventor: Peter Todd Williams, San Carlos, CA (US)

(73) Assignee: Hydra Concepts, San Carlos, CA (US)

( * ) Notice: Subject to any disclaimer, the term of this patent is extended or adjusted under 35 U.S.C. 154(b) by 156 days.

(21) Appl. No.: 16/882,247

(22) Filed: May 22, 2020

(65) Prior Publication Data

US 2020/0371128 A1 Nov. 26, 2020

Related U.S. Application Data

(60) Provisional application No. 62/852,163, filed on May 23, 2019.

(51) Int. Cl.
| | |
|---|---|
| *F41A 31/00* | (2006.01) |
| *G01P 3/66* | (2006.01) |
| *F41G 3/12* | (2006.01) |
| *F41A 21/32* | (2006.01) |

(52) U.S. Cl.
CPC .............. *G01P 3/665* (2013.01); *F41A 21/32* (2013.01); *F41G 3/12* (2013.01)

(58) Field of Classification Search
CPC .......... F41A 31/00; F41A 99/00; G01P 3/665; G01P 13/0066
See application file for complete search history.

(56) References Cited

U.S. PATENT DOCUMENTS

| | | | |
|---|---|---|---|
| 5,349,853 A | 9/1994 | Oehler | |
| 6,064,196 A | 5/2000 | Oberlin et al. | |
| 6,644,296 B2 | 11/2003 | Gardner, Jr. | |
| 8,800,359 B2 | 8/2014 | Furch et al. | |
| 8,935,958 B2 | 1/2015 | Downing | |
| 9,513,308 B2 | 12/2016 | Jung et al. | |
| 10,309,750 B2 | 6/2019 | Olkinuora | |
| 2004/0250615 A1 | 12/2004 | Alberti et al. | |
| 2005/0115316 A1* | 6/2005 | Giusti | F41A 21/32 73/488 |
| 2008/0211710 A1* | 9/2008 | Frick | G01S 11/023 342/104 |
| 2012/0125092 A1* | 5/2012 | Downing | G01L 5/14 73/167 |
| 2021/0389080 A1* | 12/2021 | McMillan | F41A 19/68 |

* cited by examiner

*Primary Examiner* — J. Woodrow Eldred
(74) *Attorney, Agent, or Firm* — Sterne, Kessler, Goldstein & Fox P.L.L.C.

(57) ABSTRACT

A system for determining the muzzle velocity of a firearm includes a firearm having a barrel and a gas block. A first sensor is arranged at a gas block and is configured to determine a change in pressure within the gas block. A second sensor is positioned at an end of the barrel of the firearm for detecting a pressure wave produced by a projectile fired by the firearm. A control unit is in communication with the first sensor and the second sensor and is configured to determine a velocity of the projectile based on information received from the first sensor and the second sensor.

20 Claims, 4 Drawing Sheets

SYSTEM FOR DETERMINING MUZZLE VELOCITY OF A FIREARM

CROSS-REFERENCE TO RELATED APPLICATION

This application claims the benefit of U.S. provisional application No. 62/852,163 filed May 23, 2019, which is incorporated herein by reference in its entirety.

FIELD

Embodiments described herein generally relate to systems for determining the muzzle velocity of a projectile fired from a firearm. Specifically, embodiments described herein relate to a system for determining the velocity of a projectile fired from a firearm using one or more sensors arranged on the firearm and a control unit that receives information from the sensors to determine the muzzle velocity.

BRIEF SUMMARY OF THE INVENTION

Some embodiments described herein relate to a system for determining the muzzle velocity of a firearm that includes a firearm having a barrel and a gas block, a first sensor arranged at a gas block configured to determine a change in pressure within the gas block, a second sensor positioned at an end of the barrel for detecting a pressure wave produced by a projectile fired by the firearm, and a control unit in communication with the first sensor and the second sensor and configured to determine a velocity of the projectile based on information received from the first sensor and the second sensor.

In any of the various embodiments described herein, the second sensor may be an acoustic pressure sensor. In some embodiments, the acoustic pressure sensor may be arranged on a rod extending from the end of the barrel.

In any of the various embodiments described herein, the first sensor may be a pressure transducer. In some embodiments, the first sensor may be positioned within a hole formed in the gas block.

In any of the various embodiments described herein, the first sensor may be a strain gauge. In some embodiments, the strain gauge may include a piezoelectric material.

In any of the various embodiments described herein, the control unit may be configured to apply a correction to the muzzle velocity as calculated based on the information received from the first and second sensors.

In any of the various embodiments described herein, a third sensor may be arranged on the barrel of the firearm and spaced from each of the first and second sensors.

Some embodiments described herein relate to system for determining the muzzle velocity of a firearm that includes a first sensor positioned on a gas block or a gas tube of the firearm configured to determine a change in pressure within the gas block or the gas tube, a second sensor positioned at an end of a barrel of the firearm configured to detect a pressure wave produced by the projectile, and a control unit in communication with the first sensor and the second sensor that is configured to determine a muzzle velocity based on information received from the first sensor and the second sensor.

In any of the various embodiments described herein, the first sensor may include a pressure sensor.

In any of the various embodiments described herein, the first sensor may include a strain gauge.

In any of the various embodiments described herein, the second sensor may include an acoustic pressure sensor. In some embodiments, the acoustic pressure sensor may be arranged on a rod that extends from the end of the barrel. In some embodiments, the system may further include a shroud positioned so as to cover the rod and the acoustic pressure sensor.

In any of the various embodiments described herein, the first sensor, the second sensor, and the control unit may be connected by one or more wires.

Some embodiments described herein relate to method for determining a muzzle velocity of a firearm, wherein the method includes detecting a change in pressure within a gas system of a firearm via a pressure sensor, detecting a pressure wave produced by a projectile escaping the barrel via an acoustic pressure sensor arranged at an end of the barrel; and calculating, by a control unit in communication with the pressure sensor and the acoustic pressure sensor, a muzzle velocity of the projectile based on data from the pressure sensor and the acoustic pressure sensor.

In any of the various embodiments described herein, the method may further include applying a correction factor to the calculated muzzle velocity.

In any of the various embodiments described herein, the pressure sensor may be arranged on a gas block of the firearm.

In any of the various embodiments described herein, calculating the muzzle velocity may include determining a time between detection of the change of pressure and detection of the pressure wave.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

DETAILED DESCRIPTION OF THE INVENTION

Figure 1:
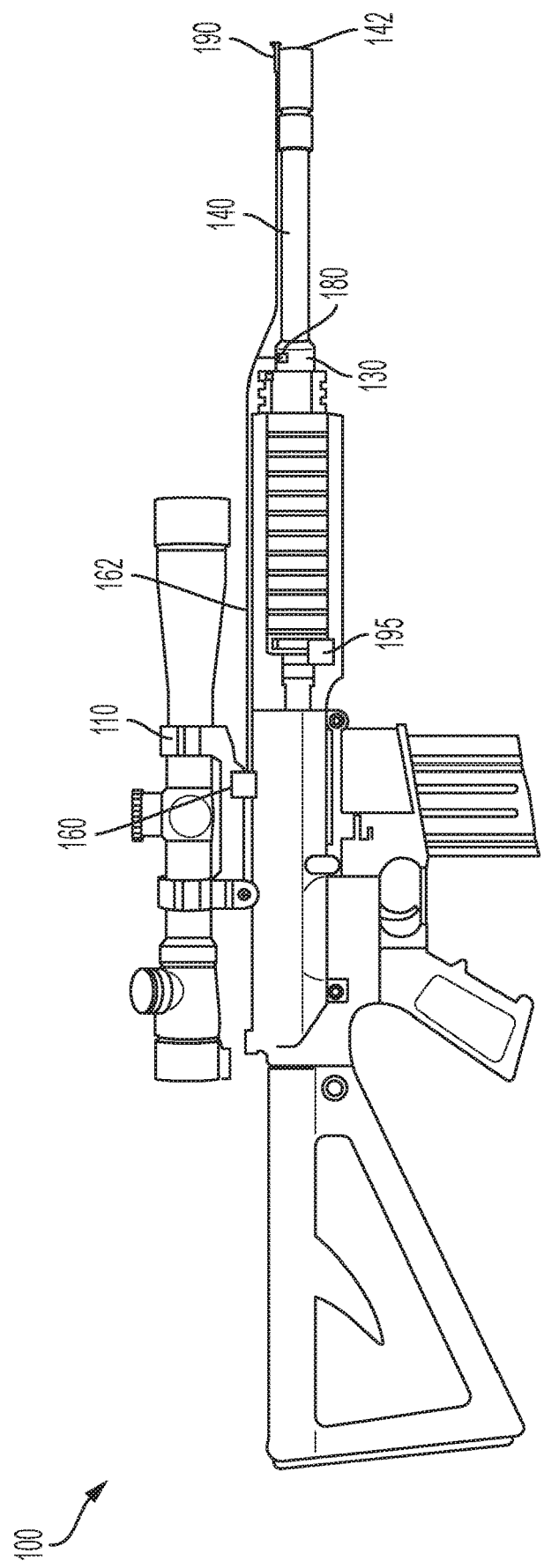
FIG. 1 shows a side view of a firearm having a system for determining muzzle velocity according to an embodiment.

Reference will now be made in detail to representative embodiments illustrated in the accompanying drawing. It should be understood that the following descriptions are not intended to limit the embodiments to one preferred embodiment. To the contrary, it is intended to cover alternatives, modifications, and equivalents as can be included within the spirit and scope of the described embodiments as defined by the claims.

The muzzle velocity of a firearm is an important parameter in determining the flight profile and trajectory of a projectile. As used herein, "muzzle velocity" is the speed of a projectile, such as a bullet, at the moment it leaves the muzzle of a firearm. A firearm may include a ballistics calculator or computer that indicates where the marksman should aim to hit a target based on a variety of considerations, including the muzzle velocity. The location where the marksman should aim may be shown on a heads-up display of the firearm. Generally, the muzzle velocity used in the ballistics calculator is based on an estimate of the muzzle velocity or the muzzle velocity is measured when zeroing the firearm prior to use of the firearm in the field. However, the muzzle velocity may change over time and during use of the firearm due to various dynamic factors including, among others, barrel cleanliness, barrel wear, the rate at which projectiles are fired, the type and size of ammunition, the temperature of the ammunition, the temperature of the firearm bore or barrel, and the characteristics of the firearm's suppressor, if any. Thus, the muzzle velocity of a firearm when used in the field may differ from the initially determined or estimated muzzle velocity, which may negatively impact the user's accuracy and ability to hit a target.

The ability to determine the muzzle velocity during use of the firearm would allow for ballistic calculators to compensate for the differing muzzle velocity of the firearm over time, increasing accuracy and the probability of the marksman hitting an intended target. Further, it would be desirable to provide a system for determining muzzle velocity of a firearm with limited modification or alteration of the firearm, such that existing firearms may continue to be used.

Some embodiments described herein relate to a system for determining a muzzle velocity of a firearm during use of the firearm. Thus, the muzzle velocity as used in the ballistic calculator may continually be updated as the firearm is used. Determining the muzzle velocity throughout the use of the firearm to account for changes in the muzzle velocity during use allows for a more accurate muzzle velocity to be used in computations performed by the ballistic calculator of the firearm to improve the accuracy of the firearm.

In some embodiments, the system may include one or more sensors positioned on the body of the firearm. The sensors are in communication with a control unit, which may include at least a microprocessor, a memory, and a clock or timer. The control unit may be located on the firearm or may be located remotely, and may be worn on a body of the user, or may be at a location remote from the firearm and the user. The control unit receives information provided by the sensors relating to the parameters of the fired projectile or the firearm, and determines a muzzle velocity based on the information received from the sensors. The control unit may further be configured to apply a correction factor in determining the muzzle velocity. The system may be integrated with the firearm, or may be retrofitted onto an existing firearm.

Figure 2:
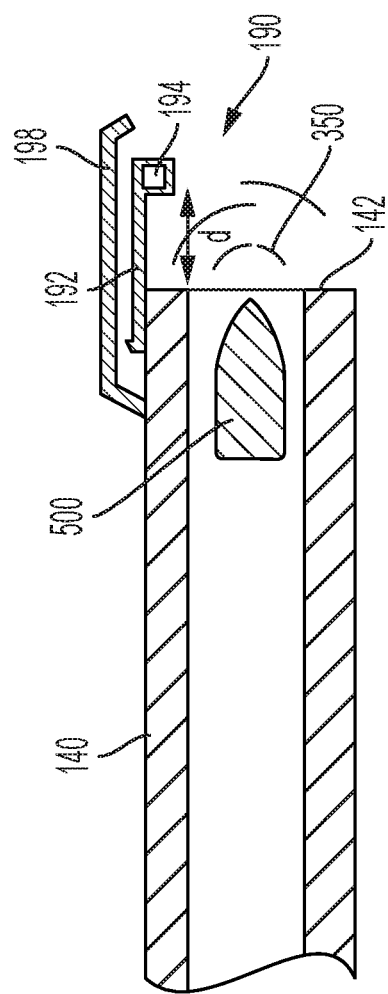
FIG. 2 shows a close-up view of a barrel of the firearm according to FIG. 1.

In some embodiments, as shown in FIGS. 1 and 2, the system for determining muzzle velocity may include two or more sensors 180, 190 positioned at two measurement points on a firearm 100. The firearm 100 may be a semi-automatic firearm, such as the M-110 SASS, SR-25, or AR-10, AR-15, M-4, or M-14, among others. The semi-automatic firearm may be gas-operated, and may have direct-gas impingement, and include a gas block and gas tube. However, in some embodiments, the firearm may be a bolt-action rifle. Such firearms may be used with suppressors, also referred to as "silencers," which may have a quick detach mounting system. The quick detach system may allow for quick attachment or detachment to the specially-designed gas block on the rifle, which may include one or more cylindrical detents.

The sensors 180, 190 may be in communication with a control unit 160 configured to determine the muzzle velocity based on data collected by the sensors 180, 190. In some embodiments, sensors 180, 190 may be in communication with control unit 160, and each other, via one or more wires 162. In some embodiments, sensors 180, 190 and control unit 160 may communicate via wireless communication.

A first sensor 180 may be mounted on the gas block 130 or may be located on the gas tube of the firearm 100 at a location immediately adjacent to the gas block 130 of the firearm 100. When the first sensor 180 is positioned on the gas block 130, the first sensor 180 may be a pressure sensor or pressure transducer, among others. The first sensor 180 may be arranged in a hole formed in the gas block 130. The first sensor 180 may be configured to determine a change in pressure within the gas block 130 or gas tube that occurs when a projectile is fired. In some embodiments, the first sensor 180 may be in-line with the impingement cylinder in a threaded insert screwed into a hole drilled in the gas block 130 so that it communicates with the gas chamber internal to the gas block 130. In embodiments in which the first sensor 180 is mounted on the gas tube adjacent to the gas block 130, the first sensor 180 may be a strain gauge, such as a piezoelectric strain gauge, that is affixed to the gas tube to sense an abrupt rise in pressure of the gas tube, such as a change in pressure on the order of 1,000 psi or more.

A second sensor module 190 may be positioned at the muzzle end of the firearm 100, or at the end of the suppressor in firearms having a suppressor. Specifically, the second sensor module 190 may be positioned on an exterior surface of the muzzle end of the firearm 100. The second sensor module 190 may be capable of detecting a shock wave 350 or dynamic pressure produced by a projectile exiting the end 142 of the barrel 140. In some embodiments, the second sensor 190 may be an acoustic sensor, such as an acoustic pressure sensor. In one aspect, the second sensor 190 may be a microphone. While it is understood that different types of sensors may be used to detect a shock wave produced by the projectile, the second sensor will be referred to herein as an acoustic pressure sensor. In some embodiments, the second sensor module 190 may include an acoustic pressure sensor 194 positioned on a rod 192 that extends beyond the end 142 of the barrel 140, or suppressor, such that the acoustic pressure sensor 194 is positioned a distance, d, beyond the end 142 of the muzzle or suppressor, as shown in FIG. 2. The distance d may be about 1 inch to about 5 inches beyond the end 142 of the muzzle. The rod 192 may extend parallel to a longitudinal axis of the barrel 140 such that the acoustic pressure sensor 194 is positioned in front of the barrel 140 (and is not within the path of the projectile 500 to be fired from the firearm 100). The acoustic pressure sensor 194 may be acoustically isolated from the barrel 140, such as by an intervening absorbing elastomer, so that the acoustic pressure sensor 194 detects the supersonic shock in the air rather than the vibration of the barrel 140 of the firearm 100.

In some embodiments, however, the acoustic pressure sensor 194 may instead be arranged on the barrel 140 adjacent the breech, such as for example, 1 inch from the breech. The blast wave, or shock wave from the fired projectile 500 may refract through the air toward the breech of the barrel 140 for detection by the acoustic pressure sensor 194.

The muzzle velocity may be calculated based on the known distance between the gas block 130 at which the first sensor 180 is located and the end 142 of the barrel 140, and the time between the first sensor 180 detecting a significant change in internal gas pressure and/or a significant change in material stress in a barrel, gas block, gas tube, or the like, and the second sensor 190 detecting a shock wave or other sharp rise in gas pressure. The time it takes for the projectile 500 to travel the length of the barrel 140 may be determined by tracking the time between the first sensor 180 detecting a change in pressure and the second sensor 190 detecting a pressure wave. Thus, the velocity may be determined based on the time it takes for the projectile to travel the known distance. The velocity so obtained may be corrected by a numerically-based estimate of the acceleration of the projectile to obtain a more accurate estimate of the muzzle velocity. Additional corrections and improvements to the estimated muzzle velocity may be afforded by the use of additional sensors, such as a third sensor, on the firearm.

In some embodiments, the first or second sensor 180, 190 may include piezoelectric material. Further, the piezoelectric material may be coated with a protective layer, such as titanium or steel. The muzzle blast creates a shock wave that, if detected by an acoustic pressure sensor, allows for detection of the moment the projectile leaves the muzzle with high precision. A small delay may be present between the projectile exiting the muzzle and the shock wave reaching the sensor. However, the system 100 for determining the muzzle velocity may be calibrated to account for such a delay. If the projectile 500 is subsonic and does not create its own shock wave, the over-pressure from the barrel 140 or the suppressor may be sufficiently high such that a shock wave is produced upon the projectile exiting the muzzle.

The sensors described herein may have a sensitivity for signaling the system, which may be a minimum pressure, such as 100 psi, or for a microphone, may be a minimum sound intensity, such as a predetermined decibel level (e.g., 100 dB). This helps to prevent incorrect measurements being taken when a projectile is not fired due to ambient sound or pressure. Further, the sensors may have a response time on the order of 1 microsecond or less to ensure accurate determination of the muzzle velocity.

In some embodiments, as shown in FIG. 2, the second sensor module 190 may include a shroud 198 positioned around the rod 192 and acoustic pressure sensor 194 so as to cover and protect the same during use of the firearm 100. The shroud 198 may be affixed at one end to the barrel 140 and may extend outward therefrom parallel to rod 192. The shroud 198 may be a flat or curved plate, and may be composed of a rigid and durable material, such as steel.

In some embodiments, a third sensor 195 may be arranged on the barrel 140 of the firearm 100 closer to the breech. The third sensor 195 may be a pressure sensor. The third sensor 195 may be arranged in a hole formed in the barrel 140. The third sensor 195 may also be in wired or wireless communication with the control unit 160. The relative locations of the first sensor 180, second sensor 190, and third sensor 195 are and distance between the sensors are known. Thus, in combination with the first and second sensors 180, 190, the third sensor 195 allows for determination of an acceleration of the projectile. The use of the third sensor 195 to determine acceleration may help to improve the accuracy of the muzzle velocity determination.

Some embodiments relate to a method for determining a muzzle velocity of a firearm. The method may include determining a pressure within a gas block of the firearm using a pressure sensor, and detecting a pressure wave produced by the projectile at the end of the barrel by an acoustic pressure sensor. A muzzle velocity may be determined based on the information from the sensors. A correction factor may be applied to the determined muzzle velocity, such as to account for acceleration of the projectile.

Figure 3:
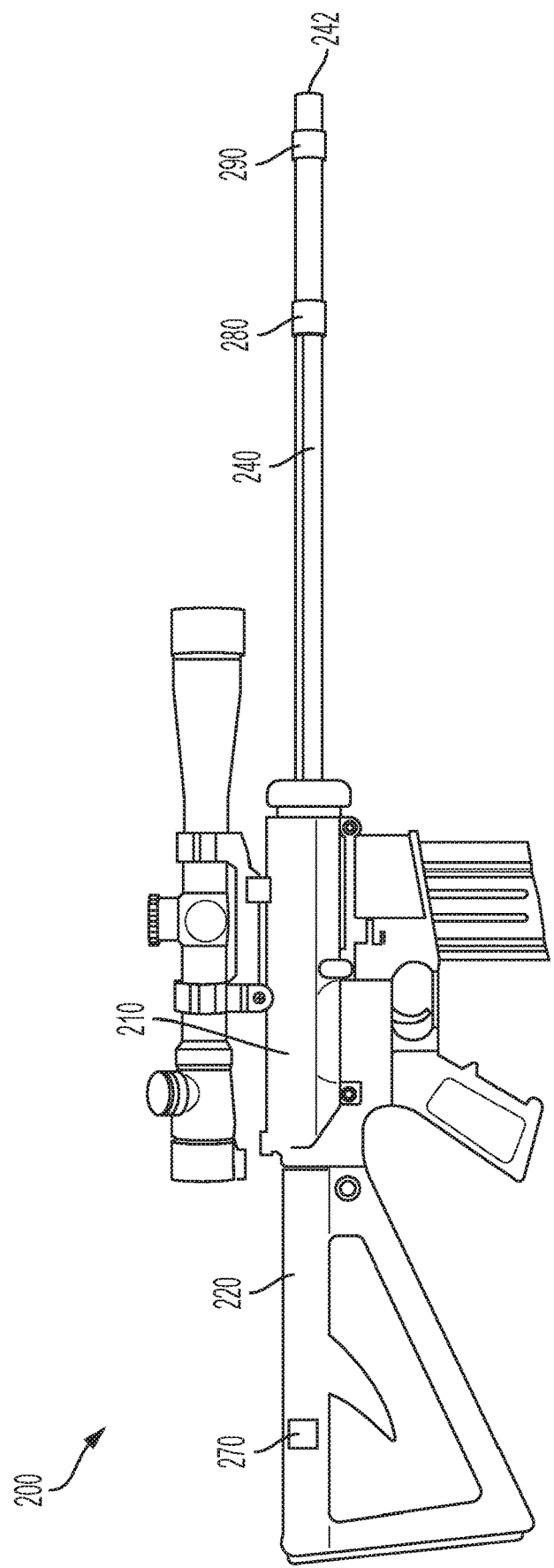
FIG. 3 shows a side view of a firearm having a system for determining muzzle velocity according to an embodiment.

In some embodiments, a system 200 for determining a muzzle velocity of a firearm 210 may include a sensor 270 positioned on the body of the firearm 210 that is configured to detect the recoil of the firearm 210 upon firing a projectile, as shown in FIG. 3. As discussed above, any type of firearm may be used, such as a rifle, including a semi-automatic sniper rifle. The sensor 270 may be an inertial sensor, such as a high resolution inertial sensor. The inertial sensor may be, for example, an accelerometer or a 6-DOF (Six Degrees of Freedom) sensor. The sensor 270 may be positioned in various locations on the body of the firearm, and can be positioned on the stock 220 of the firearm 210. By detecting the magnitude of recoil of the firearm 210, the velocity of the bullet at the muzzle, i.e., the muzzle velocity may be determined based upon conservation of momentum. Thus, the magnitude of the recoil can be used to determine the bullet velocity, given calibration that calibrates the recoil to the bullet velocity. For example, the muzzle velocity may be measured at a firing range and compared to the muzzle velocity as determined based on the recoil. To the extent that the calculated muzzle velocity differs from the muzzle velocity determined empirically, a correction factor may be applied. The calibration of the system may be performed separately, such as on a controlled firing range with a chronometer.

In some embodiments, the system for determining muzzle velocity may include one or more sensors positioned on the firearm to detect the presence of the projectile, e.g., bullet, at the location of the sensor. In an embodiment having one sensor positioned along the barrel of the firearm, the sensor may be a pressure sensor. The pressure sensor may be configured to measure the peak pressure or the strain of the barrel near the chamber, wherein the peak pressure correlates with the bullet velocity.

In some embodiments, the system for determining muzzle velocity may include two sensors. A first sensor may be configured to determine when the primer of the firearm is struck. It is noted that after pulling the trigger of the firearm, there may be a lag between the pull of the trigger and when the primer is struck. Thus, the first sensor may detect when the trigger is pulled and may account for the delay in pulling the trigger and striking the primer, or may measure striking of the primer directly. The system may further include a second sensor arranged at a location on the barrel, referred to as a "measurement point," that detects when the projectile is present at that location as the bullet travels through the barrel. The muzzle velocity may then be determined by the control unit of the system based upon the known distance traveled by the projectile to reach the measurement point on the barrel at which the sensor is positioned and the time that it takes the projectile to reach the first location as measured by a timer that may be initiated when the primer is struck as determined by the first sensor.

In some embodiments, the system can use two measurement points along the barrel of the firearm, as shown in FIG. 3. A first sensor 280 may be positioned at a first location or measurement point along the barrel 240, and a second sensor 290 may be positioned at a second location or measurement point along the barrel 240 that is longitudinally spaced from the first measurement point. For example, in one embodiment, a first sensor 280 may be positioned 7 inches from the breech of the barrel 240, and a second sensor 290 may be positioned 1 inch from the breech of the barrel, such that the sensors are separated by a distance of 6 inches. A timer can be used to measure the amount of time it takes the projectile to travel from the first measurement point to the second measurement point, and the sensors 280, 290 allow for determination of when the projectile is present at each measurement point. Thus, the muzzle velocity may be determined as the distance traveled between the measurement points divided by the time it takes the projectile to travel between the first and second measurement points.

The first and second sensors 280, 290 may be configured to detect the pressure within the barrel 240 in order to determine the time at which a bullet passes each measurement point. When a projectile is fired, the high pressure gas behind the bullet is significantly greater than the pressure in front of the bullet as it travels through the barrel, and thus the pressure within the barrel may spike as the bullet passes the measurement point.

The first and second sensors 280, 290 may measure the strain of the barrel material during the firing of the projectile. In such embodiments, the sensors may be strain gauges, such as a piezoelectric strain gauge, among other types of strain gauges known in the art. The system may include an analog circuit having a phase-lock loop that detects a change in resonance in the analog circuit due to a change of capacitance or inductance of the piezoelectric strain gauge, or other sensor. The use of a strain gauge is beneficial in that no modification of the barrel of the firearm is required, and the strain gauge can be arranged on an exterior of the barrel, such as by the use of glue, adhesives or an epoxy resin, among other fastening methods. Alternatively, the pressure within the barrel may be measured directly using a pressure sensor, such as a piezoelectric pressure gauge. The pressure sensor may be placed within a hole or opening tapped or drilled into the barrel. Alternatively, depending upon the type of firearm, the pressure gauge may sample gas pressure in a gas line, such as in an SR-25 semi-automatic sniper rifle.

Figure 4:
FIG. 4 shows views of a barrel of a firearm having sensors according to an embodiment.

In some embodiments, each sensor may be an inductive sensor, such as an inductive loop wrapped one or more times around a portion of the length of the barrel, as shown in FIG. 4. The inductive sensors 380, 390 determine the presence of the bullet at the location of the sensor. An AC current can be run through the inductive loop at a high frequency, and each inductive sensor 380, 390 may detect when a bullet passes through the inductive loop by use of a phase-lock sensor to detect a frequency shift or an amplitude modulation detector to detect the peak amplitude, as will be appreciated by one of ordinary skill in the art. Inductive sensors may be particularly suited for use in firearms having a barrel formed from a composite material, such as carbon fiber or the like. Alternatively, rather than being wrapped around the barrel, the inductive loop may be arranged on the side of the barrel, similar to an antennae for RFID tag.

While the present disclosure refers primarily to acoustic pressure sensors, pressure sensors, strain gauges, and inductive loop sensors, it is appreciated that the present invention is not limited to the use of such sensors and various other types of sensors may be used to detect the presence of the bullet at a particular location along the length of the barrel (at a "measurement point"). For example, a Hall effect sensor may be used to detect a voltage difference (a Hall voltage) across an electrical conductor, in order to sense when a bullet passes a certain point on a barrel. An eddy current sensor may be used to detect the presence of the bullet at a location on the barrel in a similar manner as the inductive sensors described above. An ultrasonic sensor may be used and may include a transmitting unit for sending signals and a receiving unit for receiving the signal that are located at the same position along the length of the barrel and which detect a shift in the phase of the signal. Further, an amplitude modulation sensor may detect a change in the amplitude of the signal picked up at the receiving unit in the ultrasonic sensor. An electrode can be positioned in an opening formed in the barrel so that when a bullet passes, the hot gas behind the bullet has high conductivity such that the conductivity may be sensed by the electrode. Two electrodes may be positioned in two holes in the barrel that are spaced from one another, and a current can run from one electrode to another through the hot gas to sense when the bullet is at the location of the electrodes.

In some embodiments, a correction may be applied to the velocity determined using one or more sensors as described herein to account for the acceleration of the bullet within the barrel. The correction may be a calibration of the system using direct measurement of the muzzle velocity. Further, the correction may be made using the pressure information from a pressure sensor located near the muzzle or in a gas system of the firearm.

In some embodiments, three or more sensors may be positioned along the length of the barrel. Such embodiments operate under similar principles as embodiments using two measurement points and two sensors, but include a third sensor (and optionally additional sensors positioned along the barrel). Thus, a third sensor may be positioned farther from the breech than the second sensor, such as at a distance of about 13 inches from the breech. The use of a third sensor allows for determination of the acceleration of the projectile as it moves through the barrel in addition to the velocity. The measured acceleration may be used to correct the muzzle velocity.

In some embodiments, the muzzle velocity may be determined by detecting a presence of the projectile at two measurement points along the path of the projectile as it is fired, such as at a first measurement point along the barrel, and at a second measurement point farther along the barrel (or just beyond the barrel), and by measuring the time it takes the bullet to travel between the two measurement points. With two measurements of the parameters of the fired projectile, the muzzle velocity may be determined by Equation (1):

$$v_m = f_c(z_2 - z_1)/(t_2 - t_1) \qquad (1)$$

wherein $v_m$ is the muzzle velocity, $f_c$ is a correction factor, $z_1$ and $z_2$ are the measurement points on the barrel measured as the distance from a common fiducial reference point, such as for example, the bolt face, and $t_1$ and $t_2$ are the times at which the projectile is present at each measurement point. Thus, $t_2 - t_1$ is the time it takes the bullet to travel from the first measurement point to the second measurement point, and $z_2 - z_1$ represents the distance traveled by the bullet between the two measurement points. The time may be measured by the control unit, which may include a constantly running timer or with an arbitrary zero-offset, or a timer started in another manner, such as starting the timer when the firearm is fired.

The correction factor ($f_c$) can be empirically determined by field testing, such as by testing at a firing range. The correction factor can also incorporate additional adjustments or calibrations derived from measurement of one or more of the peak pressure at the breech of the firearm, the peak strain at the breech of the firearm, or the magnitude of rifle recoil, among other considerations, as discussed herein.

For example, the pressure measurement can be correlated with the correction factor as a linear function as represented by Equation 2:

$$f_c = f_0 + g(P - P_0) \qquad (2)$$

wherein g is a linear fitting coefficient, P is the maximum chamber pressure for a round that has been fired, $P_0$ is the nominal maximum chamber pressure, and $f_0$ is the best-fit correction factor for the nominal pressure.

The maximum chamber pressure P may be measured directly, such as by a pressure sensor, or the pressure may be inferred or calculated by measuring strain using a strain gauge. In order to measure the pressure or strain, a sensor or a "pick-up" may be used. The sensor may be an acoustic pressure sensor for detecting a shock wave. The best-fit correction factor may be determined empirically, such as at a firing range, as discussed above.

It is to be appreciated that the Detailed Description section, and not the Summary and Abstract sections, is intended to be used to interpret the claims. The Summary and Abstract sections may set forth one or more but not all exemplary embodiments of the present invention(s) as contemplated by the inventors, and thus, are not intended to limit the present invention(s) and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention(s) that others can, by applying knowledge within the skill of the art, readily modify and/or adapt for various applications such specific embodiments, without undue experimentation, and without departing from the general concept of the present invention(s). Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance herein.

The breadth and scope of the present invention(s) should not be limited by any of the above-described exemplary embodiments, but should be defined only in accordance with the following claims and their equivalents.

What is claimed is:

1. A system for determining the muzzle velocity of a firearm, comprising:
    a firearm having a barrel and a gas block;
    a first sensor arranged at the gas block configured to determine a change in pressure within the gas block;
    a second sensor positioned at an end of the barrel for detecting a pressure wave produced by a projectile fired by the firearm; and
    a control unit in communication with the first sensor and the second sensor and configured to determine a velocity of the projectile based on information received from the first sensor and the second sensor.

2. The system of claim 1, wherein the second sensor is an acoustic pressure sensor.

3. The system of claim 2, wherein the acoustic pressure sensor is arranged on a rod extending from the end of the barrel.

4. The system of claim 1, wherein the first sensor is a pressure transducer.

5. The system of claim 4, wherein the first sensor is positioned within a hole formed in the gas block.

6. The system of claim 1, wherein the first sensor is a strain gauge.

7. The system of claim 6, wherein the strain gauge comprises a piezoelectric material.

8. The system of claim 1, wherein the control unit is configured to apply a correction to the muzzle velocity as calculated based on the information received from the first and second sensors.

9. The system of claim 1, further comprising a third sensor arranged on the barrel of the firearm and spaced from each of the first and second sensors.

10. A system for determining the muzzle velocity of a firearm, comprising:
    a first sensor positioned on a gas block or a gas tube of the firearm configured to determine a change in pressure within the gas block or the gas tube;
    a second sensor positioned at an end of a barrel of the firearm configured to detect a pressure wave produced by a projectile fired by the firearm; and
    a control unit in communication with the first sensor and the second sensor that is configured to determine a muzzle velocity based on information received from the first sensor and the second sensor.

11. The system of claim 10, wherein the first sensor comprises a pressure sensor.

12. The system of claim 10, wherein the first sensor comprises a strain gauge.

13. The system of claim 10, wherein the second sensor comprises an acoustic pressure sensor.

14. The system of claim 13, wherein the acoustic pressure sensor is arranged on a rod that extends from the end of the barrel.

15. The system of claim 14, further comprising a shroud positioned so as to cover the rod and the acoustic pressure sensor.

16. The system of claim 10, wherein the first sensor, the second sensor, and the control unit are connected by one or more wires.

17. A method for determining a muzzle velocity of a firearm, the method comprising:
    detecting a change in pressure within a gas system of a firearm via a pressure sensor;
    detecting a pressure wave produced by a projectile escaping a barrel of the firearm via an acoustic pressure sensor arranged at an end of the barrel; and
    calculating, by a control unit in communication with the pressure sensor and the acoustic pressure sensor, a muzzle velocity of the projectile based on data from the pressure sensor and the acoustic pressure sensor.

18. The method of claim 17, further comprising:
    applying a correction factor to the calculated muzzle velocity.

19. The method of claim 17, wherein the pressure sensor is arranged on a gas block of the firearm.

20. The method of claim 17, wherein calculating the muzzle velocity comprises determining a time between detection of the change of pressure and detection of the pressure wave.

* * * * *